United States Patent
Tanimoto et al.

(10) Patent No.: US 7,031,808 B2
(45) Date of Patent: Apr. 18, 2006

(54) APPARATUS AND METHOD FOR ESTIMATING A TURNING CHARACTERISTIC OF A VEHICLE

(75) Inventors: Mitsutaka Tanimoto, Susono (JP); Satoru Ohsaku, Suntou-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 511 days.

(21) Appl. No.: 10/459,597

(22) Filed: Jun. 12, 2003

(65) Prior Publication Data

US 2004/0002795 A1 Jan. 1, 2004

(30) Foreign Application Priority Data

Jun. 27, 2002 (JP) ............................. 2002-187678

(51) Int. Cl.
*G05D 1/00* (2006.01)
*B60T 8/24* (2006.01)

(52) U.S. Cl. ............................. 701/1; 701/72; 340/440
(58) Field of Classification Search ................ 701/1, 701/72, 41; 303/140; 340/440; 280/5.507
See application file for complete search history.

(56) References Cited

U.S. PATENT DOCUMENTS

| 5,641,212 A | * | 6/1997 | Sakai .......................... 303/147 |
| 6,108,599 A | | 8/2000 | Yamamoto et al. |
| 2001/0021885 A1 | | 9/2001 | Schulke et al. |

FOREIGN PATENT DOCUMENTS

| DE | 198 05 736 A 1 | 8/1998 |
| DE | 199 49 157 A 1 | 6/2000 |
| EP | 1 088 739 A2 | 4/2001 |
| JP | A 10-258720 | 9/1998 |

* cited by examiner

*Primary Examiner*—Yonel Beaulieu
(74) *Attorney, Agent, or Firm*—Oliff & Berridge, PLC

(57) ABSTRACT

An apparatus and method for estimating a turning characteristic of a vehicle provided with a controller that performs the following steps are provided. That is, the controller estimates a value corresponding to a standard turning state based on vehicle running data of when the vehicle is turning, estimates a transfer function between the value corresponding to the turning state and a value corresponding to an actual turning state, estimates a turning characteristic of the vehicle based on the transfer function, determines whether the vehicle is in a critical turning state, and the prohibits the estimated turning characteristic from being used when it is determined that the vehicle is in the critical turning state.

34 Claims, 11 Drawing Sheets

FIG. 14
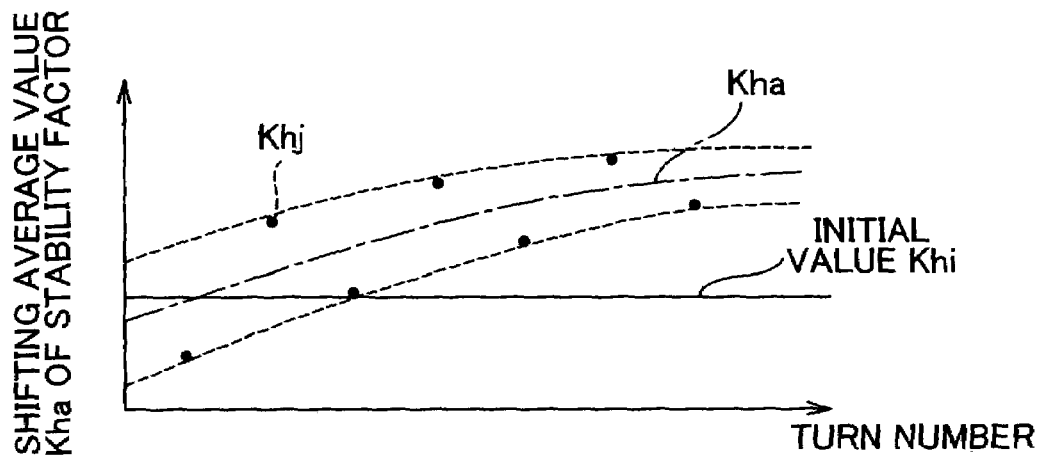
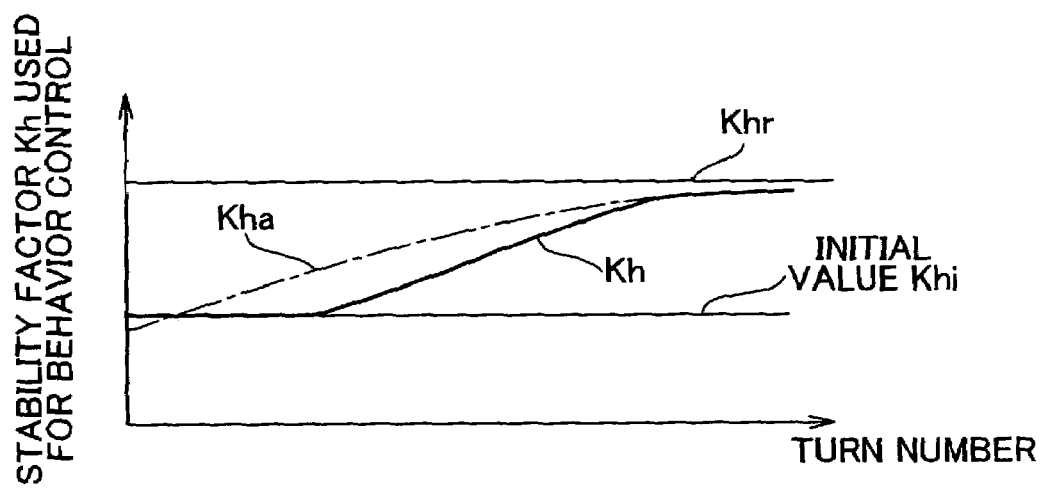
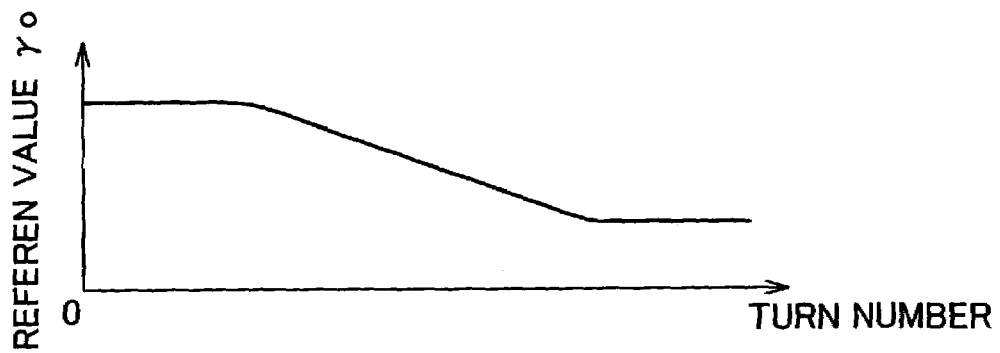

APPARATUS AND METHOD FOR ESTIMATING A TURNING CHARACTERISTIC OF A VEHICLE

INCORPORATION BY STANDARD

The disclosure of Japanese Patent Application No. 2002-187678 filed on Jun. 27, 2002, including the specification, drawings and abstract is incorporated herein by standard in its entirety.

BACKGROUND OF THE INVENTION

1. Field of the Invention

The invention relates to an apparatus and method for estimating a turning characteristic of a vehicle.

2. Description of the Related Art

An apparatus for estimating a turning characteristic of a vehicle such as an automobile or the like, is known which detects a vehicle speed, a steering angle, and a yaw rate using sensors when the vehicle is running, and estimates a stability factor as the turning characteristic of a vehicle based on those detected values. An example of such art is disclosed in Japanese Patent Laid-Open Publication No. 10-258720.

According to that apparatus, because the stability factor is estimated based on the actual turning state of the vehicle, the standard yaw rate can be calculated more accurately than when it is calculated using a stability factor that is set at a fixed value. As a result, it is possible to accurately execute vehicle control based on the standard yaw rate and the actual yaw rate of the vehicle.

The apparatus of the aforementioned publication calculates the stability factor only when the lateral acceleration of the vehicle is equal to, or less than, a predetermined value. However, there is no reference of that apparatus estimating a transfer function between the standard yaw rate of the vehicle and the actual yaw rate of the vehicle, and then estimating a turning characteristic of the vehicle, such as the stability factor, based on that transfer function. Accordingly, in this respect there remains room for improvement in the foregoing apparatus.

For example, when estimating the transfer function between the standard yaw rate of the vehicle and the actual yaw rate of the vehicle as a first order delay transfer function and then estimating the turning characteristic of the vehicle, such as the stability factor, based on that transfer function, it is necessary to estimate the transfer function appropriately. In order to estimate the transfer function appropriately, however, the transfer function must be estimated based on vehicle running data that is suitable for making the estimation.

Therefore, in the actual turning state of the vehicle there are times when the turning characteristic of the vehicle is unable to be estimated appropriately due to the fact that the vehicle running data is not always necessarily suitable for appropriately estimating the transfer function so the transfer function is not always estimated appropriately. Also, when the transfer function is estimated as a first order delay transfer function, it is necessary to select the running data suitable for estimating the transfer function while ensuring continuity of the running data.

SUMMARY OF THE INVENTION

In view of the foregoing problems, such as those that arise when estimating the transfer function between the value corresponding to the standard turning state and the value corresponding to the actual turning state when the vehicle turns, and estimating the turning characteristic of the vehicle based on that transfer function, the invention primarily estimates the transfer function appropriately so as to estimate the turning characteristic of the vehicle appropriately, by selecting the running data suitable for estimating the transfer function while ensuring the continuity of the running data.

Accordingly, an apparatus for estimating a turning characteristic of a vehicle is provided, which has a controller which (i) estimates a value corresponding to a standard turning state based on vehicle running data of when the vehicle is turning, (ii) estimates a transfer function between the value corresponding to the standard turning state and a value corresponding to an actual turning state, (iii) estimates the turning characteristic of the vehicle based on the transfer function, (iv) determines whether the vehicle is in a critical turning state, and (v) prohibits the estimated turning characteristic from being used when it is determined that the vehicle is in the critical turning state.

In addition, a method for estimating a turning characteristic of a vehicle is also provided as another exemplary embodiment of the invention. This method includes the steps of (i) estimating a value corresponding to a standard turning state based on vehicle running data of when the vehicle is turning, (ii) estimating a transfer function between the value corresponding to the standard turning state and a value corresponding to an actual turning state, (iii) estimating the turning characteristic of the vehicle based on the transfer function, (iv) determining whether the vehicle is in a critical turning state, and (v) prohibiting the estimated turning characteristic from being used when it is determined that the vehicle is in the critical turning state.

According to the apparatus and method for estimating a turning characteristic of a vehicle, as described above, because it is determined whether the vehicle is in the critical turning state and the estimated turning characteristic is not used when it has been determined that the vehicle is in the critical turning state, it is possible to reliably avoid inaccurately estimating the turning characteristic of the vehicle due to inaccurately estimating the value corresponding to the standard turning state based on the vehicle running data when the vehicle is in the critical turning state and therefore inaccurately estimating the transfer function between the value corresponding to the standard turning state and the value corresponding to the actual turning state.

BRIEF DESCRIPTION OF THE DRAWINGS

The above mentioned embodiment and other embodiments, objects, features, advantages, technical and industrial significances of this invention will be better understood by reading the following detailed description of the exemplary embodiments of the invention, when considered in connection with the accompanying drawings, in which:

FIG. 14 is a graph showing an example of a change in the shifting average value Kha, the stability factor Kh used in the stability control, and the reference value γo, where the horizontal axis represents the turn number No of the turn suitable for use in the estimation.

DETAILED DESCRIPTION OF THE EXEMPLARY EMBODIMENTS

In the following description and the accompanying drawings, the present invention will be described in more detail in terms of exemplary embodiments.

Before describing the first exemplary embodiment of the invention, the relationship between a value corresponding to a turning state, such as yaw rate or the like, and the turning characteristic of the vehicle will be described.

Figure 15:
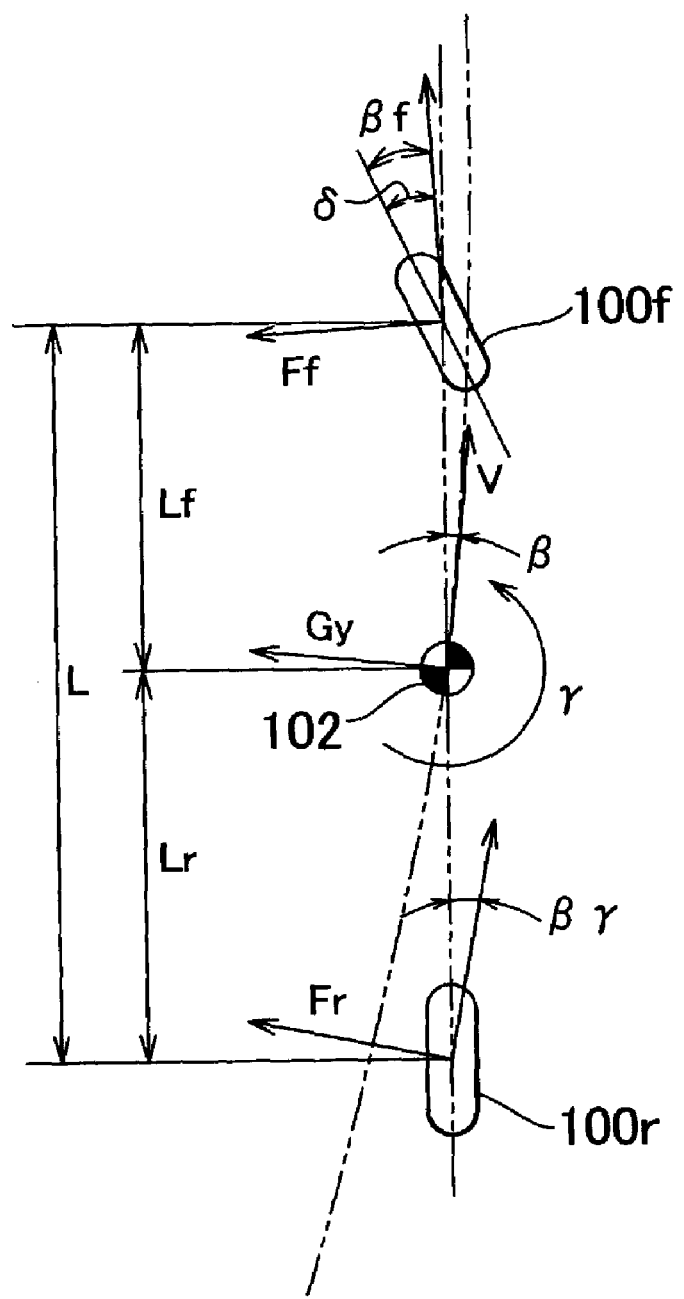
FIG. 15 is an explanatory view showing two wheels of a vehicle, for the purpose of estimating a standard yaw rate, the stability factor, and the steering response time constant coefficient.

Expressions 1 through 6 below are obtained by balancing out the force of the vehicle and the moment of the vehicle and the like, where a vehicle mass is M, a yaw inertia moment is I, lateral acceleration of the vehicle is Gy, a cornering force of a front wheel 100f is Ff, cornering force of a rear wheel 100r is Fr, an actual steering angle of the front wheel 100f is δ, a distance between a center of gravity 102 of the vehicle and a front wheel axle is Lf, a distance between the center of gravity 102 of the vehicle and a rear wheel axle is Lr, a wheel base of the vehicle is L (=Lf+Lr), a yaw rate of the vehicle is γ, a slip angle of the front wheel is βf, a slip angle of the rear wheel is βr, a cornering power of the front wheel is Kf, a cornering power of the rear wheel is Kr, a slip angle of the vehicle body is β, a vehicle speed is V, and a yaw angle rate (i.e., the derivative of the yaw rate γ) of the vehicle is γd, in the model shown in FIG. 15 which shows two wheels of a vehicle.

$$MGy = Ff + Fr \quad (1)$$

$$I\gamma d = LfFf - LrFr \quad (2)$$

$$Ff = Kf\beta f \quad (3)$$

$$Fr = Kr\beta r \quad (4)$$

$$\beta f = \delta - \beta + (Lf/V)\gamma \quad (5)$$

$$\beta r = -\beta + (Lr/V)\gamma \quad (6)$$

From Expressions 1 through 6, we get Expression 7 below.

$$\left(\frac{Lr}{Kf} - \frac{Lf}{Kr}\right)\frac{M}{L}Gy + \left(\frac{1}{Kf} + \frac{1}{Kr}\right)\frac{1}{L}\gamma d = \delta - \frac{L}{V}\gamma \quad (7)$$

Supposing that the vehicle speed V is essentially constant, Expressions 8 through 10 below can be obtained by Laplace transforming Expression 7, with the Laplace operator being s, and reducing the yaw rate γ.

$$\gamma(s) = \frac{1}{1 + TpVs}\left(\frac{\delta(s)}{L} - KhGy(s)\right)V \quad (8)$$

$$Kh = \frac{M}{L^2}\left(\frac{Lr}{Kf} - \frac{Lf}{Kr}\right) \quad (9)$$

$$Tp = \frac{I}{L^2}\left(\frac{1}{Kf} + \frac{1}{Kr}\right) \quad (10)$$

Kh in Expression 9 is a stability factor and Tp in Expression 10 is a coefficient relating to the vehicle speed V of a first order delay corollary that has a time constant which relies on vehicle speed (in this specification, this coefficient will be referred to as "steering response time constant coefficient"). These values are parameters that define the steering response related to yaw movement of the vehicle, i.e., they are the turning characteristics of the vehicle. Also, Expression 8 is an expression used to calculate the yaw rate γ of the vehicle from the actual steering angle δ of the front wheels, the vehicle speed V, and the lateral acceleration Gy. The yaw rate calculated from this linearized model is the value corresponding to the standard turning state for the yaw rate, i.e., the standard yaw rate.

An ARX (auto-regressive exogenous model) is used as an estimation model to estimate the stability factor Kh and the steering response time constant coefficient Tp in Expression 8. This ARX uses the recursive ordinary least squares approach for the estimating algorithm. Expression 8 clearly indicates a first order delay corollary so the ARX model can be written as shown in Expression 11 below, where u(k) is the input at time k, y(k) is the output at time k, and e(k) is white noise.

$$y(k) + ay(k-1) = bu(jk) + e(k) \quad (11)$$

Here, by using a time shift operator $z^{-1}$, Expression 11 can be modified as shown in Expression 12 below. Accordingly, Expression 13 below can be obtained.

$$y(k)+az^{-1}y(k)=bu(k)+e(k) \quad (12)$$

$$y(k) = \frac{b}{1+az^{-1}}u(k) + e(k) \quad (13)$$

The stability factor Kh and the steering response time constant coefficient Tp in Expression 8 can be estimated by applying the standard yaw rate calculated according to Expression 8 based on the actual steering angle δ of the front wheels, the vehicle speed V, and the lateral acceleration Gy, to the u(k) in Expression 13, applying the actual yaw rate γ to the y(k), and estimating parameters a and b of a dispersion time transfer function from the standard yaw rate to the actual yaw rate.

Figure 1:
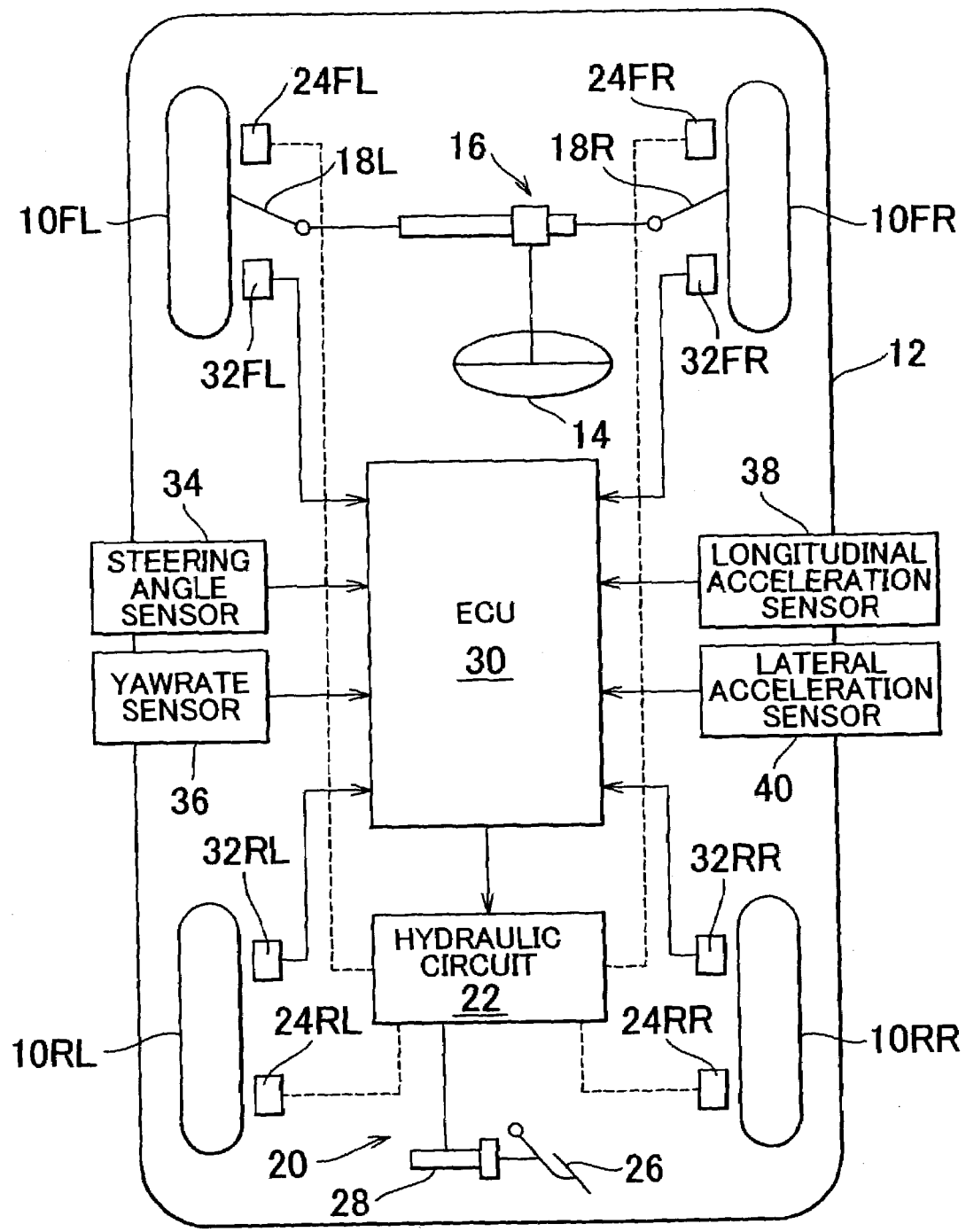
FIG. 1 is a block view schematically showing one exemplary embodiment of an apparatus for estimating a turning characteristic that has been applied to a vehicle behavior control apparatus, according to the invention.

The first exemplary embodiment will now be described based on the above information. FIG. 1 is a block diagram schematically showing a first exemplary embodiment of an apparatus for estimating turning characteristic according to the invention, which has been applied to a behavior control apparatus of a vehicle.

In the drawing, 10FL and 10FR denote left and right front wheels, respectively, of a vehicle 12, and 10RL and 10RR denote left and right rear wheels, respectively, of the vehicle 12. The wheels 10FL and 10FR, which function as steered wheels, are steered via tie-rods 18L and 18R by a rack-and-pinion type power steering apparatus 16 driven in response to steering of a steering wheel 14 by a driver.

Braking force for the wheels is determined by braking pressure of wheel cylinders 24FR, 24FL, 24RR, and 24RL, which is controlled by a hydraulic circuit 22 of a brake apparatus 20. Although not shown in the drawing, the hydraulic circuit 22 includes an oil reservoir, an oil pump, and various valve devices and the like. The braking pressure of each wheel cylinder is normally controlled by a master cylinder 28 which is driven in response to depression of a brake pedal 26 by the driver. When necessary, the braking pressure of each wheel cylinder is also controlled by an ECU 30, as will be described later.

Pressure sensors 32FR and 32RL are provided in the wheel cylinders of the wheels 10FR and 10RL, respectively. These pressure sensors 32FR and 32RL detect a pressure Pi (i=fr, fl, rr, rl) of the corresponding wheel cylinder. A steering angle sensor 34 which detects a steering angle θ is provided on a steering column that is coupled to the steering wheel 14.

A yaw rate sensor 36 that detects the yaw rate γ of the vehicle, a longitudinal acceleration sensor 38 that detects a longitudinal acceleration Gx of the vehicle, and a lateral acceleration sensor 40 that detects the lateral acceleration Gy of the vehicle and are provided in the vehicle 12. The steering angle sensor 34, the yaw rate sensor 36, and the lateral acceleration sensor 40 detect the steering angle, the yaw rate, and the lateral acceleration, respectively, with the direction of the vehicle turning to the left being positive.

As shown in the drawing, signals indicative of the pressure Pi detected by the pressure sensors 32FR and 32RL, a signal indicative of the steering angle θ detected by the steering angle sensor 34, a signal indicative of the yaw rate γ detected by the yaw rate sensor 36, a signal indicative of the longitudinal acceleration Gx detected by the longitudinal acceleration sensor 38, and a signal indicative of the lateral acceleration Gy detected by the lateral acceleration sensor 40 are all input into the ECU 30.

Although not shown in the drawing, the ECU 30 includes a CPU, ROM, EEPROM, RAM, buffer memory, and an input/output port device, each of which include a microcomputer of a typical construction which connects the CPU, ROM, EEPROM, RAM, buffer memory, and input/output port device together via a bi-directional common bus. The EEPROM stores an initial value Khi of the stability factor Kh and an initial value Tpi of the steering response time constant coefficient Tp used for calculating a standard yaw rate γ(s) according to Expression 8. These initial values are set for each vehicle when each vehicle is shipped. These initial values are updated appropriately as estimated values calculated based on turning data of the vehicle when the vehicle is not in a critical turning state, which will be described in detail later.

Figure 2:
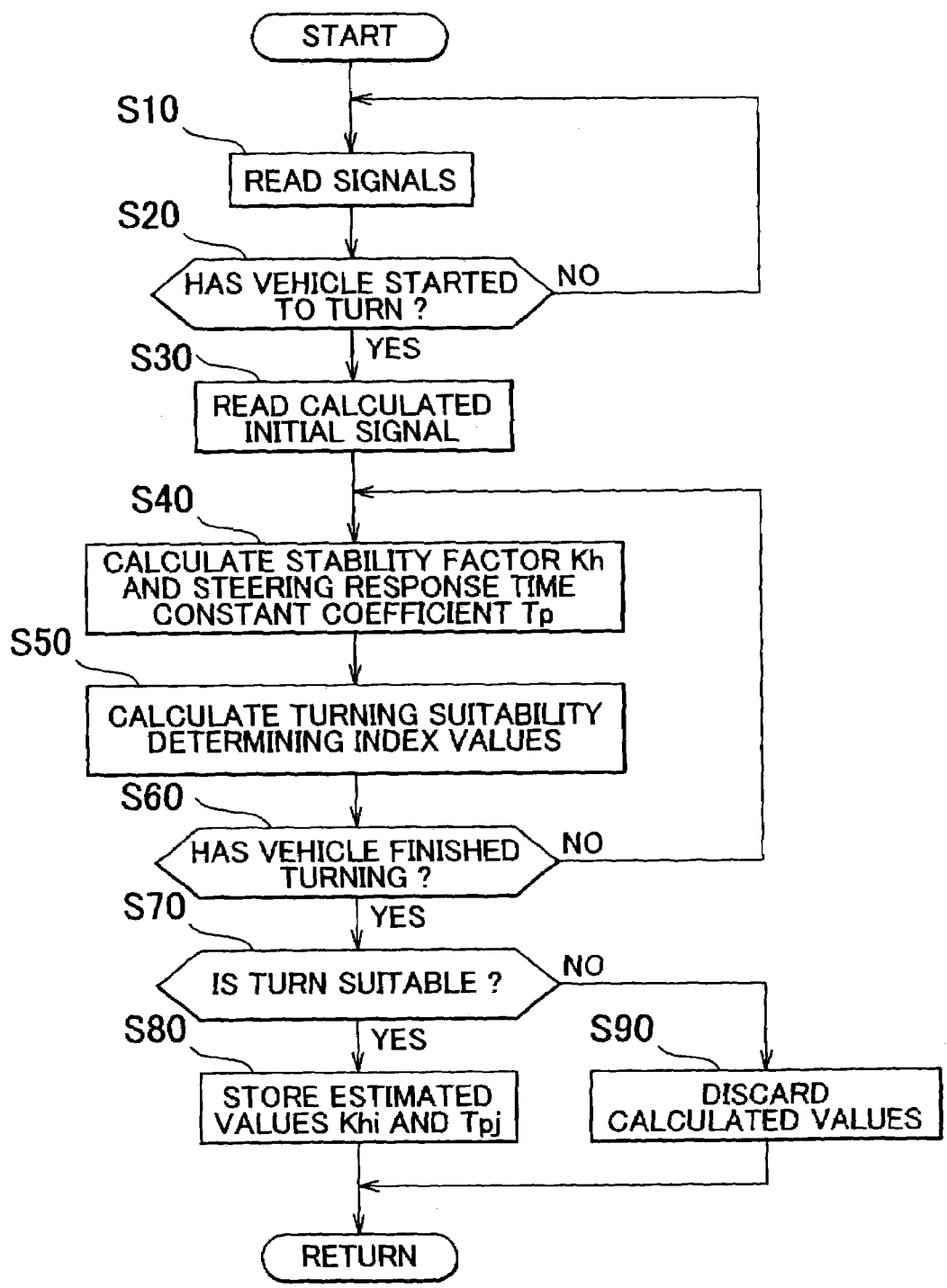
FIG. 2 is a flowchart illustrating an calculation routine for estimating a stability factor Kh in the exemplary embodiment.

When the vehicle starts to turn, the ECU 30 calculates the estimated values of the stability factors Kh and the steering response time constant coefficients Tp by estimating the parameters a and b in Expression 13, as described above, for each control cycle based on the turning data, such as the steering angle, according to the flowchart in FIG. 2, to be described later. Further, the ECU 30 calculates a turning suitability determining index value and determines, when the vehicle has finished turning, whether the turn is suitable for estimating the stability factor Kh and the steering response time constant coefficient Tp based on that turning suitability determining index value. When the ECU 30 determines that the turn is suitable for estimating the stability factor Kh and the steering response time constant coefficient Tp, it calculates an estimated value Khj of the stability factor Kh and an estimated value Tpj of the steering response time constant coefficient Tp, which it then stores in the buffer memory.

The buffer memory stores n number (n being the maximum) of the estimated values Khj of the stability factors Kh and estimated values Tpj (j=1, 2, . . . , n in the order calculated) of the steering response time constant coefficients Tp for each turn, with one turn being from start to finish of a turn of the vehicle. When more than the n number of the estimated values is calculated, the oldest estimated value is discarded, so the n number of the estimated values Khj of the stability factors Kh and estimated values Tpj of the steering response time constant coefficients Tp is always stored.

When the new estimated value Khj of the stability factor Kh is calculated and stored in the buffer memory, the ECU 30 then calculates a shifting average value Kha of the estimated values, including the newest estimated value, and stores it in the buffer memory (m being the maximum number) according to the flowchart shown in FIG. 3, to be described later. As shown in FIG. 14, a change gradient Ak and a shifting dispersion value Bk of the shifting average value Kha (i.e., a value corresponding to the shifting average value of the sum of the squares of the differences between the shifting average values Kha and the estimated values Khj) are calculated for each turn that is determined to be suitable for estimation, and a reliability Rk ($0 \leq Rk \leq 1$) of the shifting average value Kha is calculated so as to become larger as the change gradient Ak or the shifting dispersion value Bk of the shifting average value Kha becomes smaller.

Then the ECU 30 calculates weights Wk1 and Wk2 based on the reliability Rk such that, as the reliability Rk increases, the weight Wk1 becomes smaller and the weight Wk2 becomes larger. Here, the weight Wk1 is the weight attributed to the initial value Khi that is stored in the EEPROM when the stability factor Kh supplied for vehicle behavior control is calculated, and the weight Wk2 is the weight attributed to the shifting average value Kha that is stored in the EEPROM when the stability factor Kh supplied for vehicle behavior control is calculated. Also, a reference value γo for determining the necessity of vehicle behavior control based on the size of a yaw rate difference Δγ, which is the difference between a yaw rate detected value γ and a target yaw rate γt, to be described later, is calculated based on the reliability Rk such that, as the reliability Rk increases, the reference value γo becomes smaller. The values of the weights Wk1 and Wk2 are equal to, or greater than, 0 and equal to, or less than, 1, and such that the sum thereof is 1.

Furthermore, the ECU 30 updates the initial value Khi of the stability factor Kh stored in the EEPROM so that it equals the last calculated shifting average value Kha when the reliability Rk continues to be 1 for a predetermined number of times or more and a difference ΔKha between a maximum value and a minimum value from among the shifting average values Kha of the stability factors Kh stored in the buffer memory is less than a reference value.

Similarly, when the new estimated value Tpj of the steering response time constant coefficient Tp is calculated and stored in the buffer memory, the ECU 30 calculates the shifting average value Tpa of the estimated values, including the newest estimated value, and stores it in the buffer memory (m being the maximum number) according to the flowchart shown in FIG. 4, which will be described later. A change gradient At and a shifting dispersion value Bt of the shifting average value Tpa (i.e., a value corresponding to the shifting average value of the sum of the squares of the differences between the shifting average values Tpa and the estimated values Tpj) are calculated for each turn that is determined to be suitable for estimation.

The ECU 30 then calculates a reliability Rt (0≦Rt≦1) of the shifting average value Tpa so that the reliability Rt increases as the change gradient At or the shifting dispersion value Bt of the shifting average value Tpa becomes smaller. The ECU 30 then calculates weights Wt1 and Wt2 based on the reliability Rt so that, as the reliability Rt increases, the weight Wt1 becomes smaller and the weight Wt2 becomes larger. Here, the weight Wt1 is the weight attributed to the initial value Tpi stored in the EEPROM when the steering response time constant coefficient Tp provided for behavior control is calculated, and the weight Wt2 is the weight attributed to the shifting average value Tpa stored in the EEPROM when the steering response time constant coefficient Tp provided for behavior control is calculated. The values of the weights Wt1 and Wt2 are equal to, or greater than, 0 and equal to, or less than, 1, and such that the sum thereof is 1.

Furthermore, the ECU 30 updates the initial value Tpi of the steering response time constant coefficient Tp stored in the EEPROM so that it equals the last calculated shifting average value Tpa when the reliability Rt continues to be 1 for a predetermined number of times or more and a difference ΔTpa between a maximum value and a minimum value from among the shifting average values Tpa of the steering response time constant coefficients Tp stored in the buffer memory is less than a reference value.

The ECU 30 also calculates the stability factor Kh as a weighted sum based on the weights Wk1 and Wk2 of the initial value Khi and the last calculated shifting average value Kha, respectively, of the stability factor Kh, which are stored in the EEPROM. The ECU 30 also calculates the steering response time constant coefficient Tp as a weighted sum based on the weights Wt1 and Wt2 of the initial value Tpi and the last calculated shifting average value Tpa of the steering response time constant coefficient Tp, respectively, which are stored in the EEPROM. The ECU 30 then uses the thus calculated stability factor Kh and steering response time constant coefficient Tp to calculate the standard yaw rate γ(s) as a target yaw rate γt according to Expression 8 above.

Then the ECU 30 calculates the yaw rate difference Δγ as the difference between the yaw rate detected value γ and the target yaw rate γt, and determines whether the turning behavior of the vehicle is deteriorating by determining whether the size of the yaw rate difference Δγ exceeds the reference value γo. When the turning behavior of the vehicle is deteriorating, the ECU 30 executes behavior control to stabilize the vehicle turning behavior.

Next, a calculation routine for estimating the stability factor Kh in the exemplary embodiment will be described with reference to the flowchart in FIG. 2. The control according to the flowchart shown in FIG. 2 is started by turning on an ignition switch, not shown, and is repeatedly executed at predetermined intervals of time.

First, in step S10, signals, such as the signal indicative of the steering angle θ, are read. Then in step S20 it is determined whether the vehicle has started to turn by determining whether an absolute value of the actual yaw rate γ of the vehicle detected by the yaw rate sensor 36 has changed from below the reference value γs (a positive constant near 0) thereof to equal to, or greater than, that reference value γs, for example. When the determination is negative, the routine returns to step S10. When the determination is positive, the routine proceeds on to step S30.

In step S30, the initial values of the stability factors Kh and the steering response time constant coefficients Tp and the like are read. If the calculated values and the like of the stability factors Kh have not been stored in step S80, which will be described later, in the last cycle, the initial value Khi and the like of the stability factor Kh stored in the EEPROM is read for example,. If the calculated values and the like of the stability factors Kh have been stored in step S80 in the last cycle, those values are read.

In step S40, the stability factor Kh and the steering response time constant coefficient Tp from Expressions 9 and 10, respectively, are calculated by calculating the actual steering angle δ of the front wheels as θ/Ns, where Ns is the steering gear ratio, and estimating the calculation parameters a and b in Expression 13 above. Then in step S50, an absolute value VXGY of the product of the vehicle speed V and the lateral acceleration Gy, an absolute value YR of the yaw rate γ, an absolute value GY of the lateral acceleration Gy, an absolute value STR of the steering angle θ, an average vehicle speed VX, and an absolute value GX of the longitudinal acceleration Gx are calculated as turning suitability determining index values.

In step S60, it is determined whether the vehicle has finished turning by determining whether the absolute value of the actual yaw rate γ of the vehicle is less than the reference value γs thereof, for example. If the determination is negative, the routine returns to step S40. If the determination is positive, the routine proceeds on to step S70.

According to the exemplary embodiment in the drawing, it is determined whether the vehicle has started and finished a turn, with the actual yaw rate γ of the vehicle as the turning suitability determining index value. Alternatively, however, the steering angle (or the actual steering angle δ of the front wheels) or the lateral acceleration Gy of the vehicle may be used as the turning suitability determining index value, or a combination of at least two values from among the actual yaw rate γ, the steering angle θ (or the actual steering angle δ of the front wheels), and the lateral acceleration Gy of the vehicle may be used as the turning suitability determining index values.

In step S70, it is determined whether the current turn is suitable for estimating the stability factor Kh and the like, i.e., it is determined whether the vehicle is in the critical turning state, by determining whether the turning suitability determining index values calculated in step S50 have fulfilled their respective conditions between the time the vehicle starts a turn and the time the vehicle finishes the turn. When the determination is positive, the routine proceeds on to step S80. When the determination is negative, the routine proceeds on to step S90.

(1) VXGYmin<max(VXGY)<VXGYmax where the maximum value of the VXGY calculated in step S50 is max(VXGY), and VXGYmin and VXGYmax are positive constants (VXGYmin<VXGYmax);

(2) YRmin<max(YR)<YRmax where the maximum value of YR calculated in step S50 is max(YR), and YRmin and YRmax are positive constants (YRmin<YRmax);

(3) GYmin<max(GY)<GYmax where the maximum value of GY calculated in step S50 is max(GY), and GYmin and GYmax are positive constants (GYmin<GYmax);

(4) STRmin<max(STR)<STRmax where the maximum value of STR calculated in step S50 is max(STR), and STRmin and STRmax are positive constants (STRmin<STRmax);

(5) VXmin<mean(VX)<VXmax where the mean value of VX calculated in step S50 is mean(VX), and VXmin and VXmax are positive constants (VXmin<VXmax);

(6) max(GX)<GXmax where the maximum value of GX calculated in step S50 is max(GX), and GXmax is a positive constant.

In step S80, the stability factor Kh and the steering response time constant coefficient Tp calculated in step S40 are stored in the buffer memory as the estimated values Khj and Tpj, respectively, together with the parameters a and b and the calculated value. Then in step S90, each of the calculated values and parameters are discarded.

Next, a routine for determining the reliability of the estimated value of the stability factor Kh according to the exemplary embodiment will be described with reference to the flowchart shown in FIG. 3. The control according to the flowchart shown in FIG. 3 is also started by turning on the ignition switch, not shown, and is repeatedly executed at predetermined intervals of time.

First, in step S110, it is determined whether the new estimated value Khj of the stability factor Kh has been stored in the buffer memory in step S80. When the determination is negative, the routine proceeds on to step S230. When the determination is positive, the routine proceeds on to step S120.

In step S120, the shifting average value Kha for the n number or less of the estimated values Khj of the stability factors Kh stored in the buffer memory is calculated. Then in step S130, the change gradient Ak of the shifting average value Kha and the shifting dispersion value Bk of the stability factor Kh are calculated.

Figure 6:
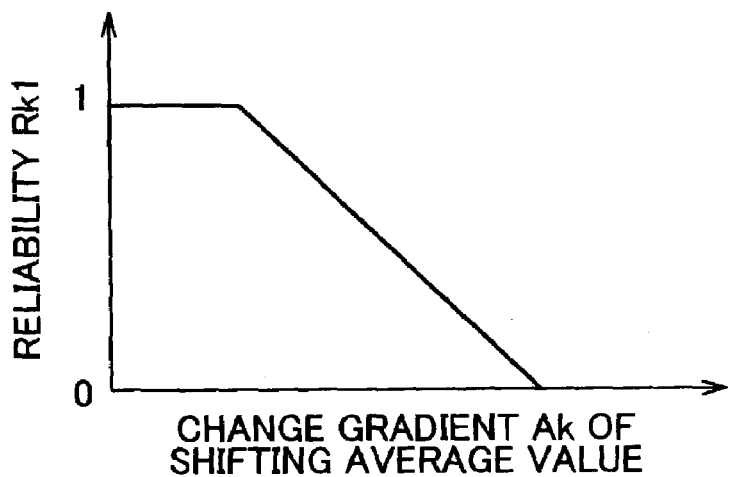
FIG. 6 is a graph illustrating the relationship between a change gradient Ak of an estimated value Kha of the stability factor and a reliability Rk1.
Figure 7:
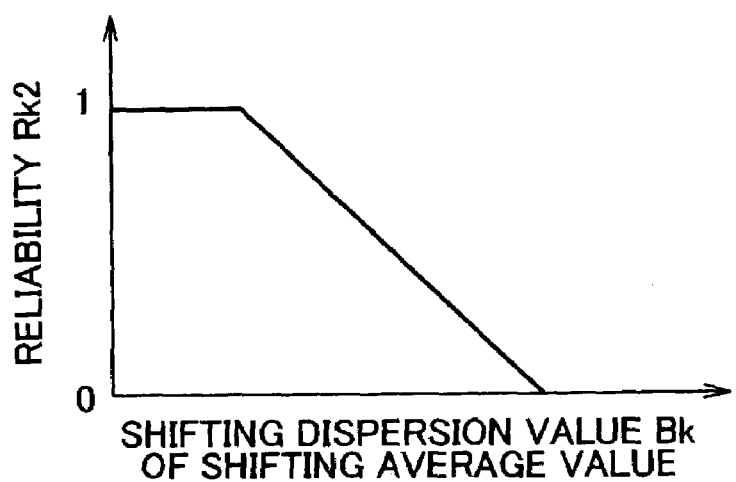
FIG. 7 is a graph illustrating the relationship between a shifting dispersion value Bk of the estimated value Kha of the stability factor and a reliability Rk2.

In step S140, a reliability Rk1 is calculated from a map corresponding to the graph in FIG. 6 based on the change gradient Ak of the shifting average value, a reliability Rk2 is calculated from a map corresponding to the graph in FIG. 7 based on the shifting dispersion value Bk, and the reliability Rk for the latest shifting average value Kha of the stability factor is calculated according to Expression 14 below. Function f in Expression 14 is a function of the reliabilities Rk1 and Rk2 in which Rk is 1 when the reliabilities Rk1 and Rk2 are each 1, e.g., a linearized sum of those reliabilities.

$$Rk = f(Rk1, Rk2) \quad (14)$$

Figure 8:
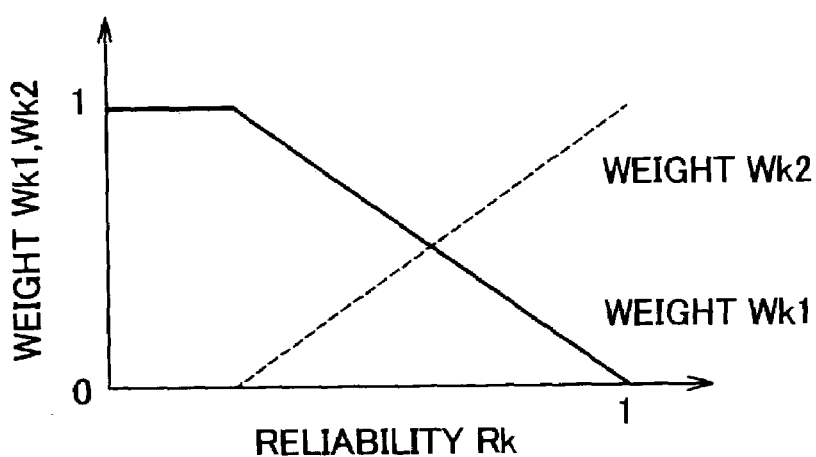
FIG. 8 is a graph illustrating the relationship between reliability Rk of the latest shifting average value Kha of the stability factor and a weight Wk1 of an initial value Khi of the stability factor and a weight Wk2 of the shifting average value Kha of the estimated value of the stability factor.
Figure 9:
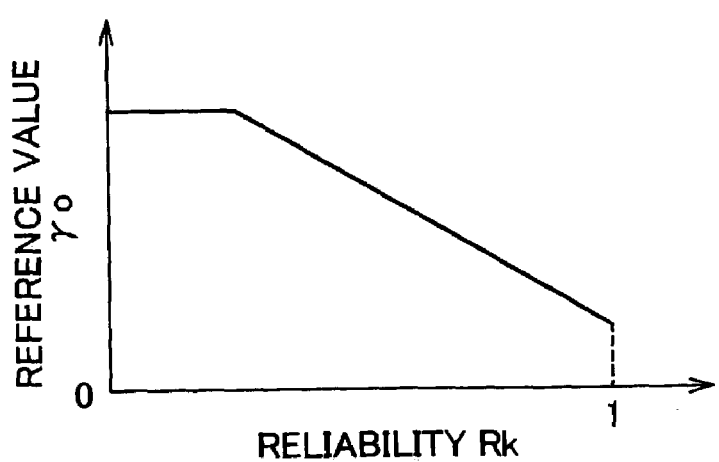
FIG. 9 is a graph illustrating the relationship between the reliability Rk of the latest shifting average value Kha of the stability factor and reference value γo for a yaw rate difference Δγ.

In step S150, the weight Wk1 attributed to the initial value Khi of the stability factor Kh, and the weight Wk2 attributed to the shifting average value Kha of the estimated value of the stability factor Kh, which are stored in the EEPROM, are calculated using a map corresponding to the graph shown in FIG. 8 based on the reliability Rk. In step S160, the reference value γo for the yaw rate difference Δγ in the behavior control (FIG. 5), which will be described later, is calculated using a map corresponding to the graph shown in FIG. 9 based on the reliability Rk.

In step S170, it is determined whether the reliability Rk is 1. When the determination is positive, the routine proceeds on to step S180, where a counter value Ck of a counter is increased by 1. When the determination in step S170 is negative, however, the routine proceeds on to step S190, where the counter value Ck of the counter is reset to 0.

In Step S200, it is determined whether the counter value Ck of the counter exceeds a reference value Cko (a positive constant integer less than m), i.e., it is determined whether the reliability Rk continues to be 1 for the predetermined number of times Cko or more. When the determination is negative, the control according to the routine shown in FIG. 3 ends at that time. When the determination is positive, the routine proceeds on to step S210.

In step S210, it is determined whether the difference ΔKha is less than a reference value Dk (a positive constant), where the difference ΔKha is the difference between a maximum value Khamax and a minimum value Khamin of the Cko number of the shifting average values Kha of the stability factors Kh when the reliability Rk is 1, from the m number or less of the shifting average values Kha of the stability factors Kh stored in the buffer memory. That is, it is determined whether there is little dispersion in the Cko number of shifting average values Kha of the stability factors Kh stored in the buffer memory. When the determination is negative, the control according to the routine in FIG. 3 ends at that time. When the determination is positive, the routine proceeds on to step S220, where the initial value Khi of the stability factor Kh stored in the EEPROM is updated so that it equals the latest shifting average value Kha of the stability factor Kh calculated in step S120.

In step S230, the weight Wk1 attributed to the initial value Khi of the stability factor Kh and the weight Wk2 attributed to the shifting average value Kha of the estimated value of the stability factor Kh, which are stored in the EEPROM, are both maintained at their respective last values. In step S240, the reference value γo for the yaw rate difference Δγ in the behavior control (FIG. 5), which will be described later, is maintained at its last value.

Next, a routine for determining the reliability of the estimated value of the steering response time constant coefficient Tp according to the exemplary embodiment will be described with reference to the flowchart shown in FIG. 4. The control according to the flowchart shown in FIG. 4 is also started by turning on the ignition switch, not shown, and is repeatedly executed at predetermined intervals of time.

Figure 3:
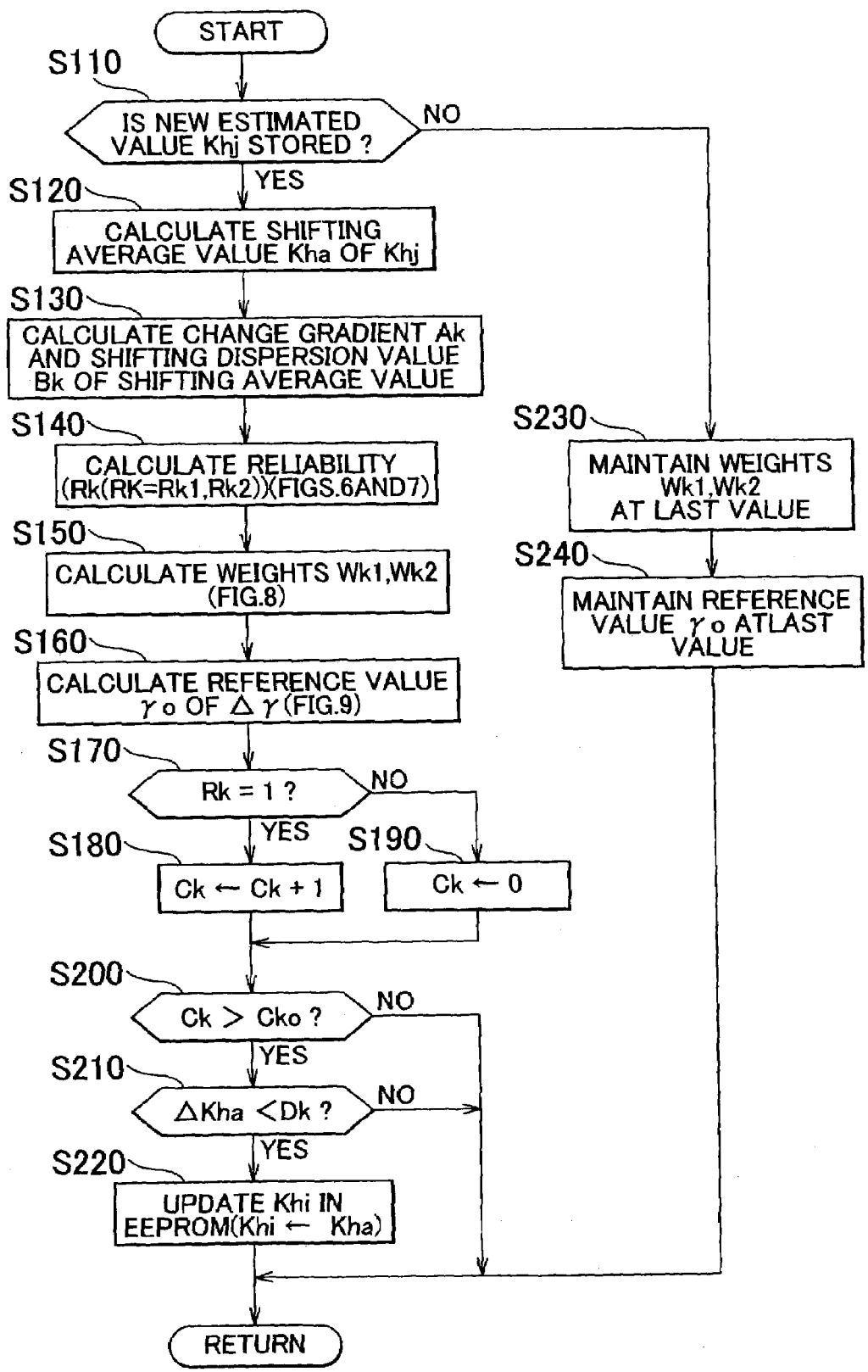
FIG. 3 is a flowchart illustrating a routine for determining the reliability of the estimated value of the stability factor Kh in the exemplary embodiment.
Figure 4:
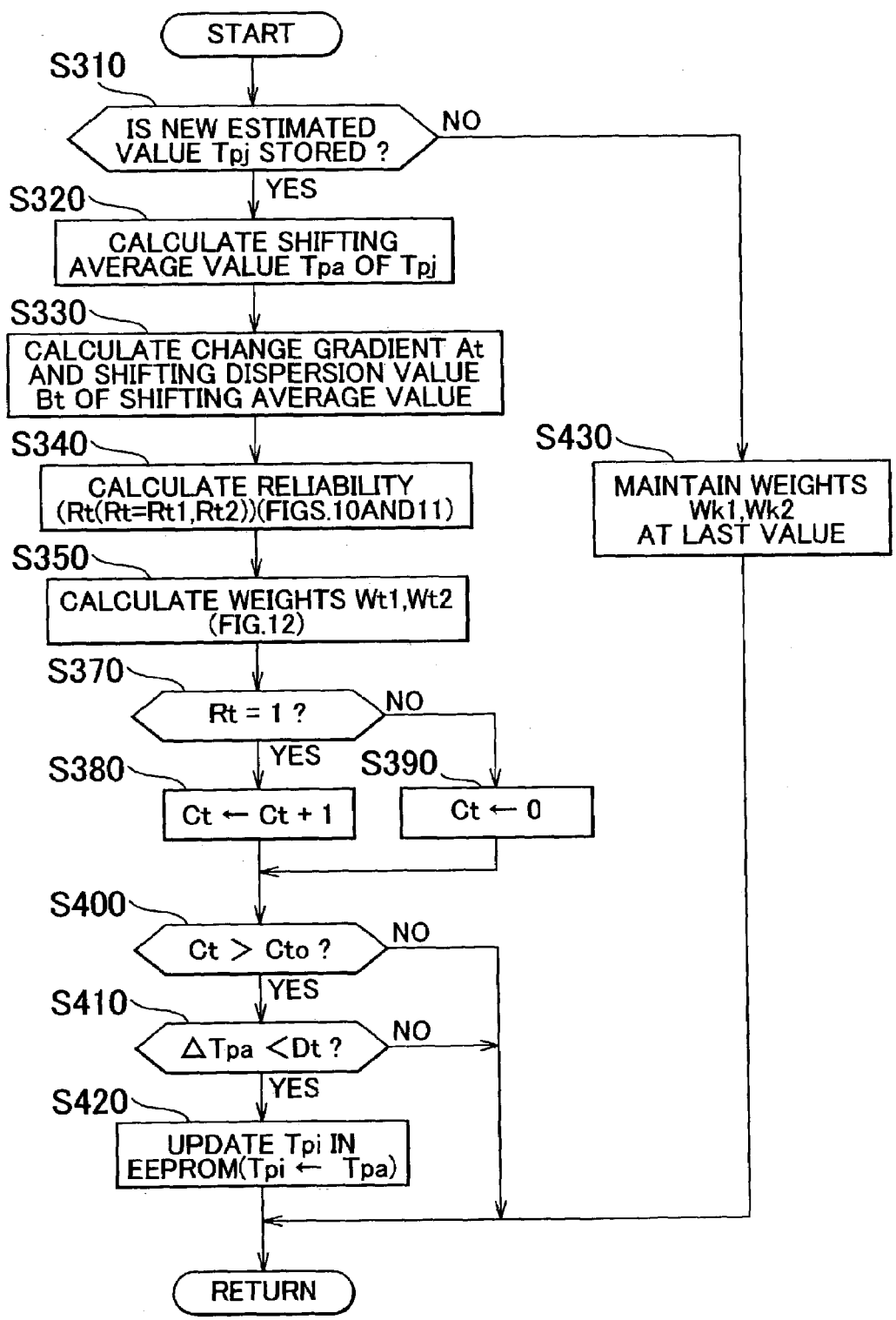
FIG. 4 is a flowchart illustrating a routine for determining the reliability of the estimated value of a steering response time constant coefficient Tp in the exemplary embodiment.

Also, those steps in FIG. 4 which correspond to steps shown in FIG. 3 shall be denoted by the corresponding step number plus 200.

First, in step S310, it is determined whether the new estimated value Tpj of the steering response time constant coefficient Tp has been stored in the buffer memory in step S80. When the determination is negative, the routine proceeds on to step S430, where the weight Wt1 attributed to the initial value Tpi of the steering response time constant coefficient Tp and the weight Wt2 attributed to the shifting average value Tpa of the estimated value of the steering response time constant coefficient Tp, which are stored in the EEPROM, are both maintained at their respective last values. When the determination is positive, the routine proceeds on to step S320.

In step S320, the shifting average value Tpa for the n number or less of the estimated values Tpj of the steering response time constant coefficients Tp stored in the buffer memory is calculated. Then in step S330, the change gradient At of the shifting average value Tpa and the shifting dispersion value Bt of the steering response time constant coefficient Tp are calculated.

Figure 10:
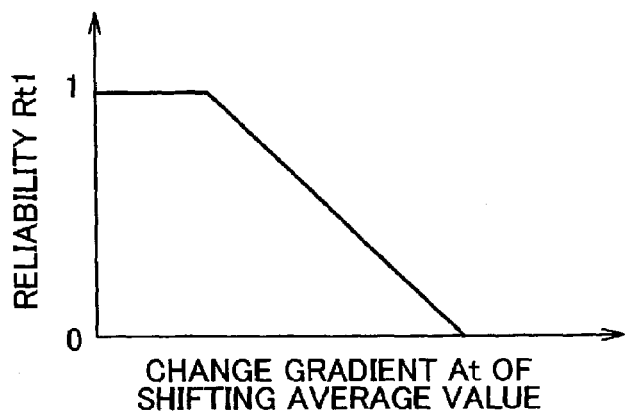
FIG. 10 is a graph illustrating the relationship between a change gradient At of a shifting average value of an estimated value Tp of the steering response time constant coefficient and a reliability Rt1.
Figure 11:
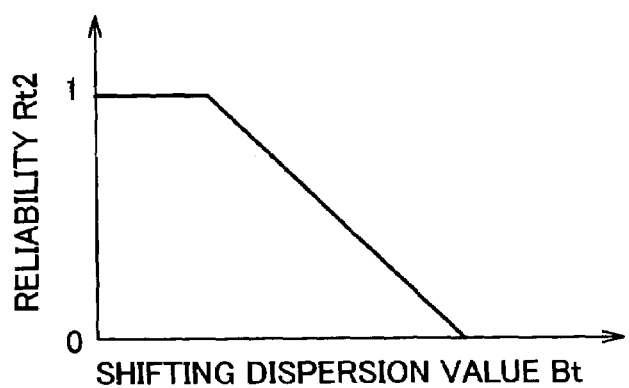
FIG. 11 is a graph illustrating the relationship between a shifting dispersion value Bt of the estimated value Tp of the steering response time constant coefficient and a reliability Rt2.

In step S340, a reliability Rt1 is calculated from a map corresponding to the graph in FIG. 10 based on the change gradient At of the shifting average value, a reliability Rt2 is calculated from a map corresponding to the graph in FIG. 11 based on the shifting dispersion value Bt, and the reliability Rt for the latest shifting average value Tpa of the steering response time constant coefficient Tp is calculated according to Expression 15 below. Function f in Expression 15 is a function of the reliabilities Rt1 and Rt2 in which Rt is 1 when the reliabilities Rt1 and Rt2 are each 1, e.g., a linearized sum of those reliabilities.

$$Rt = f(Rt1, Rt2) \tag{15}$$

Figure 12:
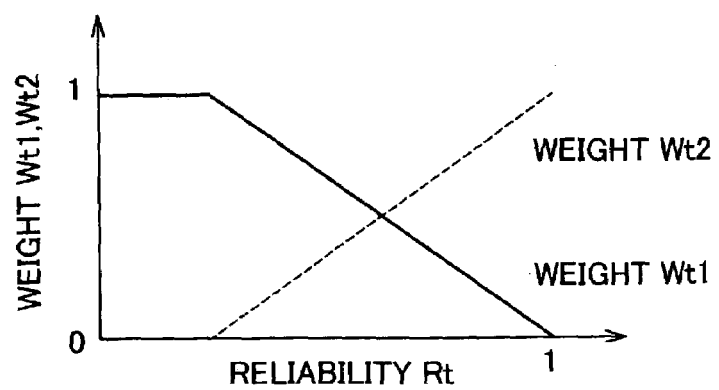
FIG. 12 is a graph illustrating the relationship between reliability Rt of the latest shifting average value Tpa of the steering response time constant coefficient and a weight Wt1 of an initial value Tpi of the steering response time constant coefficient and a weight Wt2 of the shifting average value Tpa of the estimated value of the steering response time constant coefficient.

In step S350, the weight Wk1 attributed to the initial value Tpi of the steering response time constant coefficient Tp and the weight Wk2 attributed to the shifting average value Tpa of the estimated value of the steering response time constant coefficient Tp, which are stored in the EEPROM, are calculated using a map corresponding to the graph shown in FIG. 12 based on the reliability Rt. The routine then proceeds directly on to step S370 without going to the step that corresponds to step S160.

In step S370, it is determined whether the reliability Rt is 1. When the determination is positive, the routine proceeds on to step S380, where a counter value Ct of a counter is increased by 1. When the determination in step S370 is negative, however, the routine proceeds on to step S390, where the counter value Ct of the counter is reset to 0.

In Step S400, it is determined whether the counter value Ct of the counter exceeds a reference value Cto (a positive constant integer less than m), i.e., it is determined whether the reliability Rt continues to be 1 for the predetermined number of times Cto or more. When the determination is negative, the control according to the routine shown in FIG. 4 ends at that time. When the determination is positive, the routine proceeds on to step S410.

In step S410, it is determined whether the difference ΔTpa is less than a reference value Dt (a positive constant), where the difference ΔTpa is the difference between a maximum value Tpamax and a minimum value Tpamin of the Cto number of the shifting average values Tpa of the steering response time constant coefficients Tp when the reliability Rt is 1, from the m number or less of the shifting average values Tpa of the steering response time constant coefficients Tp stored in the buffer memory. That is, it is determined whether there is little dispersion in the Cto number of shifting average values Tpa of the steering response time constant coefficients Tp stored in the buffer memory. When the determination is negative, the control according to the routine in FIG. 4 ends at that time. When the determination is positive, the routine proceeds on to step S420, where the initial value Tpi of the steering response time constant coefficient Tp stored in the EEPROM is updated so that it equals the latest shifting average value Tpa of the steering response time constant coefficient Tp calculated in step S320.

Figure 5:
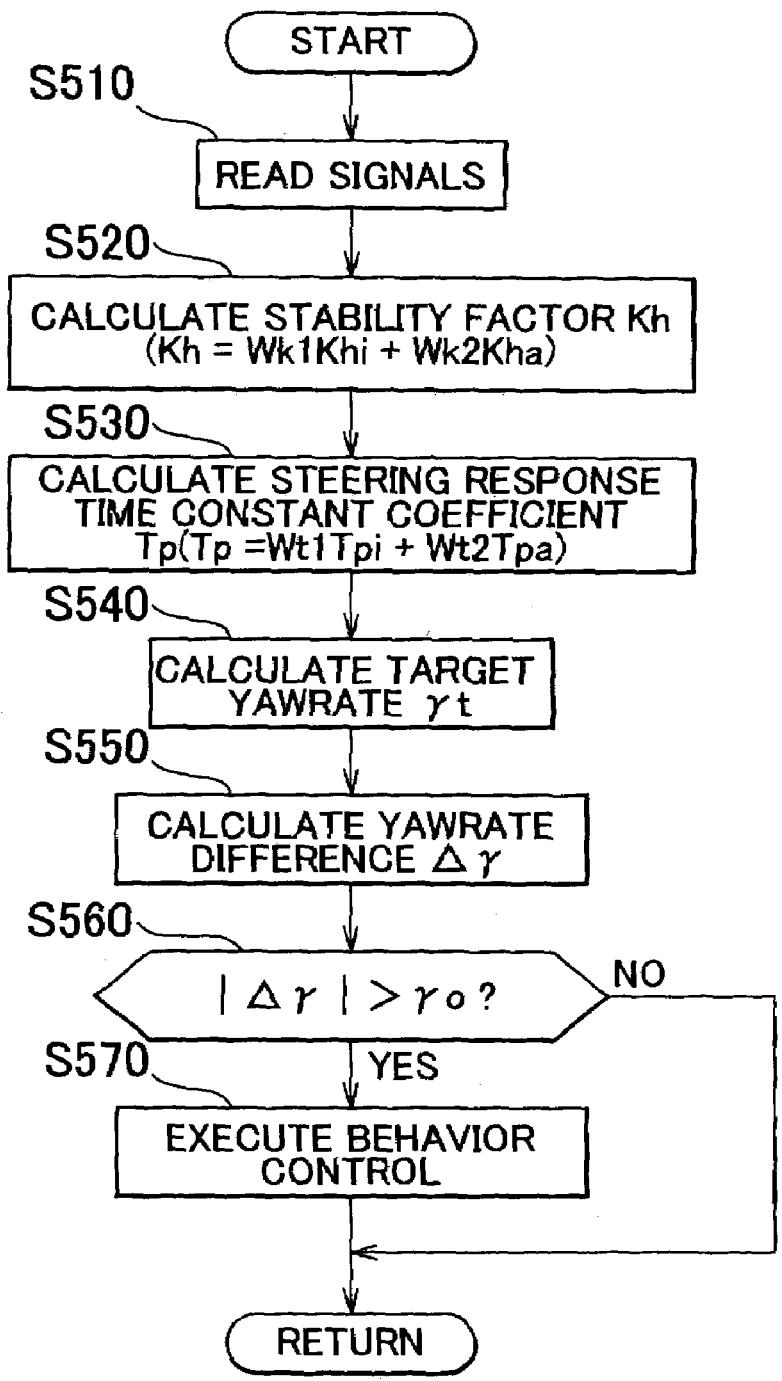
FIG. 5 is a flowchart illustrating a behavior control routine in the exemplary embodiment.

Next, a vehicle behavior control routine according to the exemplary embodiment will be described with reference to the flowchart shown in FIG. 5. The control according to the flowchart shown in FIG. 5 is started by turning on an ignition switch, not shown, and is repeatedly executed at predetermined intervals of time.

First, in step S510, signals, such as the signal indicative of the steering angle θ, are read. Then in step S520, the stability factor Kh is calculated according to Expression 16 below as a weighted sum based on and the weights Wk1 and Wk2 attributed to the initial value Khi and the last calculated shifting average value Kha, respectively, of the stability factor Kh, which are stored in the EEPROM.

$$Kh = Wk1Khi + Wk2Kha \tag{16}$$

Similarly, the steering response time constant coefficient Tp is calculated according to Expression 16 below as a weighted sum based on the weights Wk1 and Wk2 attributed to the initial value Tpi and the last calculated shifting average value Kha of the steering response time constant coefficient Tp, which are stored in the EEPROM.

$$Tp = Wt1Tpi + Wt2Tpa \tag{17}$$

In step S540, the actual steering angle δ of the front wheels is calculated based on the steering angle θ using the stability factor Kh and the steering response time constant coefficient Tp calculated in steps S520 and S530, respectively. Along with this, the standard yaw rate γ(s) is also calculated as the target yaw rate γt of the vehicle according to Expression 8 above based on the actual steering angle δ and the like.

In step S550, the yaw rate difference Δγ is calculated as the difference between the yaw rate detected value γ and the target yaw rate γt according to Expression 18 below.

$$\Delta\gamma = \gamma - \gamma t \tag{18}$$

In step S560, it is determined whether the absolute value of the yaw rate difference Δγ exceeds the reference value γo set in step S160 or step S240, i.e., it is determined whether it is necessary to stabilize the turning behavior of the vehicle. When the determination is negative, the control according to the routine in FIG. 5 ends at that time. When the determination is positive, the routine proceeds on to step S570.

In step S570, a target yaw moment Mt and a target deceleration Gxt of the vehicle are calculated for stabilizing the turning behavior of the vehicle by reducing the size of the yaw rate difference Δγ using a method that is well known to those skilled in the art, for example. Then, a target braking pressure Pti (i=fr, fl, rr, rl) for each wheel is calculated to achieve the target yaw moment Mt and the target deceleration Gxt. The braking pressure Pi of each wheel is then controlled so as to equal its corresponding target braking pressure Pti.

As is evident from the description above, according to the exemplary embodiment in the drawings, when the vehicle starts to turn, such that the determination in step S20 is positive, the estimated value Khj of the stability factor Kh and the estimated value Tpj of the steering response time constant coefficient Tp are calculated in step S40 by estimating the parameters a and b in Expression 13, as described above, for each control cycle based on turning data such as the steering angle θ.

When the vehicle finishes the turn, such that the determination in step S60 is positive, it is then determined in step S70 whether the current turn is suitable for estimating the stability factor Kh and the steering response time constant coefficient Tp, based on the turning suitability determining index values. When it has been determined that the turn is suitable for estimating the stability factor Kh and the steering response time constant coefficient Tp, the routine proceeds on to step S80, where the estimated value Khj of the stability factor Kh and the estimated value Tpj of the steering response time constant coefficient Tp are stored in the buffer memory. Conversely, when it is determined that the turn is not suitable for estimating the stability factor Kh and the steering response time constant coefficient Tp, the routine proceeds on to step S90, where the calculated values are discarded.

Therefore, according to the exemplary embodiment in the drawings, the parameters a and b in Expression 13 above can be estimated based on the turning data for a turn suitable for estimation, i.e., when the vehicle is not in the critical turning state. As a result, the estimated value Khj of the stability factor Kh and the estimated value Tpj of the steering response time constant coefficient Tp can be appropriately calculated that correspond to the actual state of the vehicle.

Also according to the exemplary embodiment in the drawings, when the new estimated value Khj of the stability factor Kh and the new estimated value Tpj of the steering response time constant coefficient Tp are stored in the buffer memory, the determination in step S110 is positive. Then, the change gradient Ak and the shifting dispersion value Bk of the shifting average value Kha of the estimated values Khj of the stability factors Kh are calculated in steps S120 and S130, respectively. In step S140, the reliability Rk of the shifting average value Kha is calculated so as to become larger as the change gradient Ak or the shifting dispersion value Bk of the shifting average value Kha becomes smaller.

Then in step S150, the weights Wk1 and Wk2 are calculated based on the reliability Rk so that, as the reliability Rk increases, the weight Wk1 decreases and the weight Wk2 increases. Here, the weight Wk1 is the weight attributed to the initial value Khi stored in the EEPROM when calculating the stability factor Kh, and the weight Wk2 is the weight attributed to the shifting average value Kha stored in the EEPROM when calculating the stability factor Kh. In step S520 of the behavior control, the stability factor Kh is calculated according to Expression 16 as a weighted sum based on the weights Wk1 and Wk2 attributed to the initial value Khi and the last calculated shifting average value Kha of the stability factor Kh.

Therefore, according to the exemplary embodiment in the drawings, because the stability factor Kh is calculated as the weighted sum of the initial value Khi of the stability factor Kh and the last calculated shifting average value Kha, such that, as the reliability Rk of the shifting average value Kha increases, the weight attributed to the shifting average value Kha increases, the stability factor Kh is able to be calculated that corresponds to the actual state of the vehicle, as opposed to the stability factor Kh being calculated as a weighted sum of the initial value Khi and the shifting average value Kha at a fixed weight without considering the reliability of the shifting average value Kha.

Also according to the exemplary embodiment in the drawings, the reference value γo for the yaw rate difference Δγ is calculated in step S160 so as to decrease as the reliability Rk of the shifting average value Kha increases. Then, it is determined in step S560 of the behavior control whether the vehicle turning behavior is deteriorating by determining whether the absolute value of the yaw rate difference Δγ exceeds the reference value γo.

Therefore, according to the exemplary embodiment in the drawings, as the reliability Rk of the shifting average value Kha decreases, a dead zone for determining deterioration of the vehicle turning behavior becomes broader, making it more difficult to make a determination that the vehicle behavior is deteriorating. Conversely, as the reliability Rk of the shifting average value Kha increases, the dead zone for determining deterioration of the vehicle turning behavior becomes narrower, making it easier to make a determination that the vehicle behavior is deteriorating. As a result, it is possible to prevent behavior control from being started unnecessarily early due to low estimation accuracy of the stability factor Kh even though the vehicle behavior is not deteriorating. Furthermore, it is possible to start behavior control quickly, and therefore effectively stabilize the vehicle behavior, when the estimation accuracy of the stability factor Kh is high which enables the turning behavior of the vehicle to be determined with high accuracy.

Also, according to the exemplary embodiment in the drawings, when the reliability Rk of the shifting average value Kha remains at 1, which is the highest, for Cko number of times or more, a positive determination is made in step S200. When the difference ΔKha between the maximum value Khamax and the minimum value Khamin of the shifting average value Kha of the stability factor Kh when the reliability Rk is 1 is less than the reference value Dk, a positive determination made in step S210. As a result, the initial value Khi of the stability factor Kh stored in the EEPROM is updated in step S220 so that it equals the latest shifting average value Kha of the stability factor Kh.

Therefore, according to the exemplary embodiment in the drawings, because the initial value Khi of the stability factor Kh is updated so that it equals the latest shifting average value Kha of the stability factor Kh when the estimated value of the stability factor gradually approaches the true stability factor of the vehicle and a stable estimated value of the stability factor is calculated, the initial value Khi of the stability factor Kh stored in the EEPROM can be set to the true stability factor of the vehicle or a value close thereto. As a result, the target yaw rate γt of the vehicle can be accurately calculated that corresponds to the actual state of the vehicle and the vehicle behavior can be accurately determined and controlled in steps S540 to S570.

Figure 13:
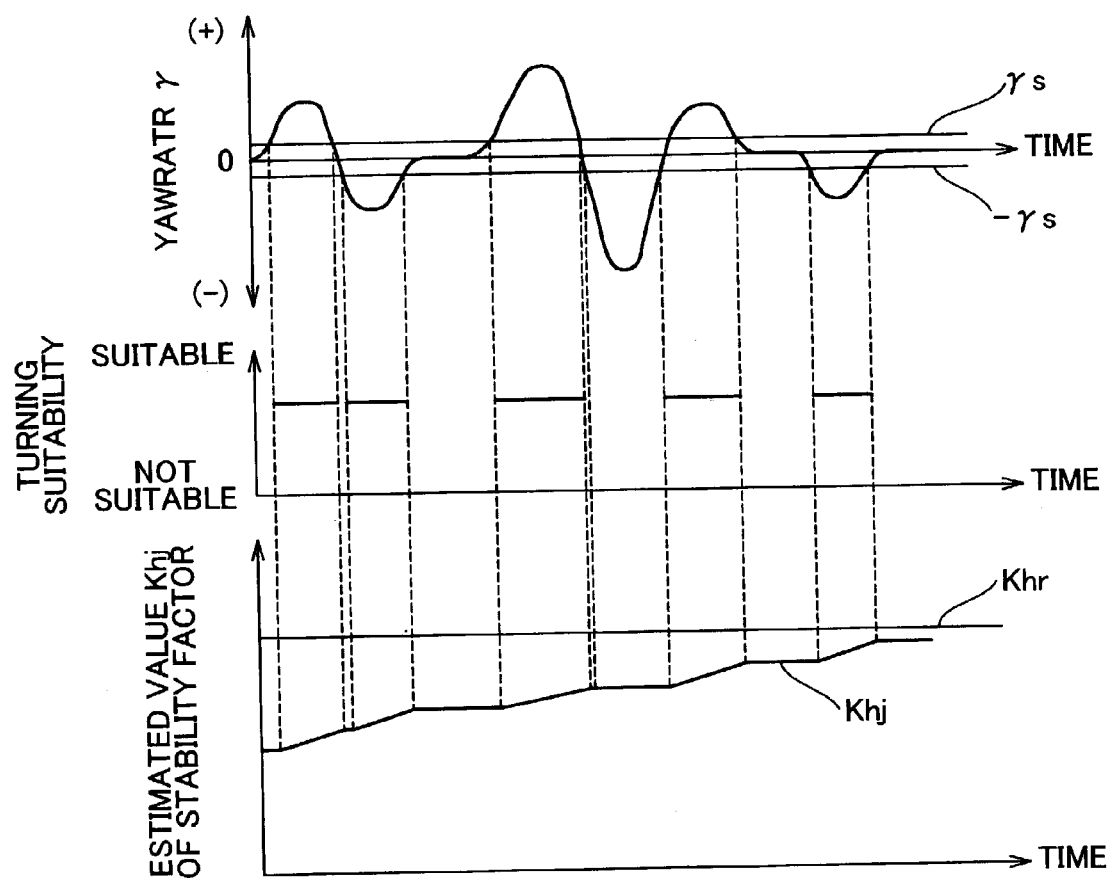
FIG. 13 is a graph showing an example of a change in a yaw rate γ detected by a yaw rate sensor, a turning suitability, and an estimated value Khj of the stability factor.

For example, FIG. 13 shows one example of a change in the yaw rate γ detected by the yaw rate sensor 36, the turning suitability, and the estimated value Khj of the stability factor Kh. As shown in the drawing, even when the initial value Khi of the stability factor Kh stored in the EEPROM differs from a true stability factor Khr of the vehicle, the estimated value Khj of the stability factor Kh can be calculated every time the vehicle makes a turn that is suitable for estimation. Then the shifting average value Kha thereof is calculated so as to gradually approach the true stability factor Khr of the vehicle.

FIG. 14 shows one example of a change in the shifting average value Kha of the stability factor Kh, the stability factor (the stability factor calculated in step S520) Kh used for vehicle behavior control, and the reference value γo, with the turn number No of the turn suitable for estimation along the horizontal axis. The change gradient Ak of the shifting average value Kha corresponds to the tendency of the shifting average value Kha in FIG. 14. From FIG. 14 it is evident that, as the shifting average value Kha gradually approaches the true stability factor Khr, the stability factor Kh used for vehicle behavior control approaches the true stability factor Khr and in response, the reference value γo gradually becomes smaller.

Also, according to the exemplary embodiment in the drawings, when the new estimated value Khj of the stability factor Kh and the new estimated value Tpj of the steering response time constant coefficient Tp are stored in the buffer memory, a positive determination is made in step S310. Then the shifting average value Tpa of the estimated value Tpj of the steering response time constant coefficient Tp is calculated in step S320 and the change gradient At and the shifting dispersion value Bt of that shifting average value Tpa are calculated in S330.

Then, the weights Wt1 and Wt2 are calculated based on the reliability Rt so that, as the reliability Rt increases, the weight Wt1 becomes smaller and the weight Wt2 becomes larger. Here, the weight Wt1 is the weight attributed to of the initial value Tpi stored in the EEPROM when the steering response time constant coefficient Tp is calculated, and the weight Wt2 is the weight attributed to the shifting average value Tpa stored in the EEPROM when the steering response time constant coefficient Tp is calculated. Then the steering response time constant coefficient Tp is calculated in step S530 according to Expression 17 as a weighted sum based on the weights Wt1 and Wt2 attributed to the initial value Tpi and the last calculated shifting average value Tpa of the steering response time constant coefficient Tp, respectively.

Therefore, according to the exemplary embodiment in the drawings, the steering response time constant coefficient Tp is calculated as the weighted sum of the initial value Tpi and the last calculated shifting average value Tpa of the steering response time constant coefficient Tp, so that, as the reliability Rt of the shifting average value Tpa increases, the weight of the shifting average value Tpa becomes larger. As a result, the steering response time constant coefficient Tp can be calculated that corresponds to the actual state of the vehicle as opposed to the steering response time constant coefficient Tp being calculated as a weighted sum of the initial value Tpi and the shifting average value Tpa at a fixed weight without considering the reliability of the shifting average value Tpa.

Also, according to the exemplary embodiment in the drawings, when the reliability Rt of the shifting average value Tpa continues to be 1, which is the highest, for Cto number of times or more, a positive determination is made in step S400. When the difference ΔTpa between the maximum value Tpamax and the minimum value Tpamin of the shifting average value Tpa of the steering response time constant coefficient Tp when the reliability Rt is 1 is less than the reference value Dt, a positive determination made in step S410. As a result, the initial value Tpi of the steering response time constant coefficient Tp stored in the EEPROM is updated in step S420 so that it equals the latest shifting average value Tpa of the steering response time constant coefficient Tp.

Therefore, according to the exemplary embodiment in the drawings, because the initial value Tpi of the steering response time constant coefficient Tp is updated so that it equals the latest shifting average value Tpa of the steering response time constant coefficient Tp when the estimated value of the steering response time constant coefficient gradually approaches the true steering response time constant coefficient of the vehicle and a stable estimated value of the steering response time constant coefficient is calculated, just as with the estimated value of the stability factor, the initial value Tpi of the steering response time constant coefficient Tp stored in the EEPROM can be set to the true steering response time constant coefficient of the vehicle or a value close thereto. As a result, the target yaw rate γt of the vehicle can be accurately calculated that corresponds to the actual state of the vehicle and the vehicle behavior can be accurately determined and controlled in steps S540 to S570.

Also, according to the exemplary embodiment in the drawings, in step S20 it is determined whether the vehicle has started turning by determining whether the absolute value of the actual yaw rate γ of the vehicle, detected by the yaw rate sensor 36, has changed from below the reference value γs (a positive constant near 0) thereof to equal to, or greater than, that reference value γs, for example. Also, in step S60, it is determined whether the vehicle has finished turning by determining whether the absolute value of the actual yaw rate γ of the vehicle is less than the reference value γs thereof, for example. As a result, the continuity of vehicle turning data for estimating the stability factor Kh and the steering response time constant coefficient Tp is able to be reliably maintained. Further, the vehicle turning data can be more effectively utilized compared to when the reference value γs is a large value.

Although the invention has been described herein with reference to specific embodiments, many modifications and variations therein will readily occur to those skilled in the art. Accordingly, all such variations and modifications are included within the intended scope of the invention.

For example, in the exemplary embodiment, the absolute value VXGY of the product of the vehicle speed V and the lateral velocity Gy, and the like are calculated as the turning suitability determining index values in step S50. Then in step S70, it is determined whether those turning suitability determining index values fulfill the aforementioned conditions (1) to (6). Alternatively, however, any of the turning suitability determining index values calculated in step S50 may be omitted.

Also, conversely, in addition to the turning suitability determining index values calculated in step S50, it may also be determined, for example, whether a difference ΔV between a maximum vehicle speed Vmax and a minimum vehicle speed Vmin during one turn is equal to, or less than, a predetermined reference value, or whether a maximum value of an absolute value of a road surface cant Cant is equal to, or less than, a reference value, where the road surface cant Cant (an angle of inclination in the lateral direction of the vehicle) is a low pass filter processing value of a difference Gy−V γ between the lateral acceleration Gy of the vehicle and the product of the vehicle speed V and the yaw rate γ of the vehicle, or the like.

Also, in the foregoing exemplary embodiment, the value corresponding to the standard turning state and the value corresponding to the actual turning state are the standard yaw rate and the actual yaw rate of the vehicle, respectively. Alternatively, however, the value corresponding to the standard turning state and the value corresponding to the actual turning state may also be a standard steering angle and an actual steering angle of the steered wheels, respectively, obtained by dividing the both standard yaw rate and the actual yaw rate by the vehicle speed V, and then multiplying those quotients by a transfer function.

Also, in the foregoing exemplary embodiment, the maximum m number of the shifting average values Kha of the stability factors Kh and the shifting average values Tpa of the steering response time constant coefficients Tp are stored in the buffer memory. Alternatively, however, the shifting average values Kha and the like may be processed with a low pass filter and the reliabilities Rk and Rt of the shifting average values Kha and the like may be calculated based on the size of the rate of change of the processed shifting average values Kha and the like, for example.

Also, in the foregoing exemplary embodiment, the reliability Rk of the shifting average value Kha is calculated as the function of the reliabilities Rk1 and Rk2, and the reliability Rt of the shifting average value Tpa is calculated as the function of the reliabilities Rt1 and Rt2. Alternatively, however, one of the reliabilities Rk1 and Rk2 may be made the reliability Rk.

Also, in the foregoing exemplary embodiment, steps S310 to S410 are executed independently of steps S110 to S220. Alternatively, however, steps S320 to S410 may be executed after steps S190 to S210, for example.

Also, in the foregoing exemplary embodiment, the determination of whether the vehicle behavior is deteriorating is made by determining whether the size of the difference between the yaw rate detected value $\gamma$ and the target yaw rate $\gamma t$ of the vehicle exceeds the reference value $\gamma o$, and that reference value $\gamma o$ is set variably depending on the reliability Rk. Alternatively, however, the reference value $\gamma o$ may also be set variably depending on the reliability Rt or both of the reliabilities Rk and Rt. Also, the vehicle behavior control may be executed by any of various methods known to those skilled in the art.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. An apparatus for estimating a turning characteristic of a vehicle, comprising:
a controller which estimates a value corresponding to a standard turning state based on vehicle running data of when the vehicle is turning, estimates a transfer function between the value corresponding to the standard turning state and a value corresponding to an actual turning state, estimates the turning characteristic of the vehicle based on the transfer function, determines whether the vehicle is in a critical turning state, and prohibits the estimated turning characteristic from being used when it is determined that the vehicle is in the critical turning state.

2. The apparatus for estimating a turning characteristic of a vehicle according to claim 1, wherein the value corresponding to the standard turning state is a standard yaw rate of the vehicle, and the value corresponding to the actual turning state is an actual yaw rate of the vehicle.

3. The apparatus for estimating a turning characteristic of a vehicle according to claim 2, wherein the turning characteristic of the vehicle is a value related to a stability factor and a time constant of a steering response.

4. The apparatus for estimating a turning characteristic of a vehicle according to claim 2, wherein a parameter of the transfer function between the standard yaw rate and the actual yaw rate is estimated, and the turning characteristic of the vehicle is estimated based on the results of that estimation.

5. The apparatus for estimating a turning characteristic of a vehicle according to claim 1, wherein the value corresponding to the standard turning state is a standard steering angle of a steered wheel, and the value corresponding to the actual turning state is an actual steering angle of the steered wheel.

6. The apparatus for estimating a turning characteristic of a vehicle according to claim 1, wherein the turning characteristic that is estimated when the vehicle is not in the critical turning state is stored, a change in the turning characteristic is determined every time the vehicle turns, and a final estimated turning characteristic is determined based on the turning characteristic, including a latest turning characteristic, when the change in the turning characteristic is within a predetermined range.

7. The apparatus for estimating a turning characteristic of a vehicle according to claim 1, wherein it is determined whether the vehicle is in the critical turning state based on the vehicle running data from after a turning index value of the vehicle increases from a reference value until that turning index value returns to the reference value.

8. The apparatus for estimating a turning characteristic of a vehicle according to claim 7, wherein the turning index value of the vehicle is at least one of a vehicle yaw rate, steering angle, and lateral acceleration.

9. The apparatus for estimating a turning characteristic of a vehicle according to claim 7, wherein the reference value is a value corresponding to a driving state of the vehicle in which the vehicle is driving essentially straight.

10. The apparatus for estimating a turning characteristic of a vehicle according to claim 7, wherein it is determined that the vehicle is in the critical turning state when a maximum value of the vehicle running data is not within a predetermined range.

11. The apparatus for estimating a turning characteristic of a vehicle according to claim 10, wherein the vehicle running data includes at least one of an absolute value of a product of a vehicle speed and a lateral acceleration of the vehicle, an absolute value of a yaw rate of the vehicle, an absolute value of the lateral acceleration of the vehicle, an absolute value of a steering angle, an average vehicle speed, and an absolute value of a longitudinal acceleration speed.

12. The apparatus for estimating a turning characteristic of a vehicle according to claim 11, wherein the vehicle running data is the absolute value of the product of the vehicle speed and the lateral acceleration of the vehicle, the absolute value of the yaw rate of the vehicle, the absolute value of the lateral acceleration of the vehicle, the absolute value of the steering angle, the average vehicle speed, and the absolute value of the longitudinal acceleration speed.

13. The apparatus for estimating a turning characteristic of a vehicle according to claim 1, wherein the controller determines a vehicle behavior using the estimated turning characteristic of the vehicle, determines a reliability of the estimated turning characteristic of the vehicle, and makes it more difficult to make a determination that the vehicle behavior has deteriorated when the reliability of the turning characteristic of the vehicle is low, compared to when that reliability is high.

14. The apparatus for estimating a turning characteristic of a vehicle according to claim 13, wherein the value corresponding to the standard turning state is a standard yaw rate of the vehicle, and the value corresponding to the actual turning state is an actual yaw rate of the vehicle.

15. The apparatus for estimating a turning characteristic of a vehicle according to claim 14, wherein the controller determines the vehicle behavior based on the size of a difference between the standard yaw rate of the vehicle and the actual yaw rate of the vehicle.

16. The apparatus for estimating a turning characteristic of a vehicle according to claim 15, wherein the controller determines the vehicle behavior by determining whether the size of the difference between the standard yaw rate of the vehicle and the actual yaw rate of the vehicle is greater than a reference value, and makes it more difficult to make the determination that the vehicle behavior has deteriorated by making that reference value larger when the reliability of the turning characteristic of the vehicle is low, compared to when that reliability is high.

17. The apparatus for estimating a turning characteristic of a vehicle according to claim 14, wherein the turning characteristic of the vehicle is a value related to a stability factor and a time constant of a steering response, and the reliability of the stability factor is determined based on a change in the stability factor that is estimated every time the vehicle turns.

18. A method for estimating a turning characteristic of a vehicle, comprising the steps of:
   estimating a value corresponding to a standard turning state based on vehicle running data of when the vehicle is turning;
   estimating a transfer function between the value corresponding to the standard turning state and a value corresponding to an actual turning state;
   estimating the turning characteristic of the vehicle based on the transfer function;
   determining whether the vehicle is in a critical turning state; and
   prohibiting the estimated turning characteristic from being used when it is determined that the vehicle is in the critical turning state.

19. The method for estimating a turning characteristic of a vehicle according to claim 18, wherein the value corresponding to the standard turning state is a standard yaw rate of the vehicle, and the value corresponding to the actual turning state is an actual yaw rate of the vehicle.

20. The method for estimating a turning characteristic of a vehicle according to claim 19, wherein the turning characteristic of the vehicle is a value related to a stability factor and a time constant of a steering response.

21. The method for estimating a turning characteristic of a vehicle according to claim 19, wherein a parameter of the transfer function between the standard yaw rate and the actual yaw rate is estimated, and the turning characteristic of the vehicle is estimated based on the results of that estimation.

22. The method for estimating a turning characteristic of a vehicle according to claim 18, wherein the value corresponding to the standard turning state is a standard steering angle of a steered wheel, and the value corresponding to the actual turning state is an actual steering angle of the steered wheel.

23. The method for estimating a turning characteristic of a vehicle according to claim 18, further comprising the steps of:
   storing the turning characteristic that is estimated when the vehicle is not in the critical turning state;
   determining a change in the turning characteristic every time the vehicle turns; and
   determining a final estimated turning characteristic based on the turning characteristic, including a latest turning characteristic, when the change in the turning characteristic is within a predetermined range.

24. The method for estimating a turning characteristic of a vehicle according to claim 18, further comprising the step of:
   determining whether the vehicle is in the critical turning state based on the vehicle running data after a turning index value of the vehicle increases from a reference value until that turning index value returns to the reference value.

25. The method for estimating a turning characteristic of a vehicle according to claim 24, wherein the turning index value of the vehicle is at least one of a vehicle yaw rate, steering angle, and lateral acceleration.

26. The method for estimating a turning characteristic of a vehicle according to claim 24, wherein the reference value is a value corresponding to a driving state of the vehicle in which the vehicle is driving essentially straight.

27. The method for estimating a turning characteristic of a vehicle according to claim 24, further comprising the step of:
   determining that the vehicle is in the critical turning state when a maximum value of the vehicle running data is not within a predetermined range.

28. The method for estimating a turning characteristic of a vehicle according to claim 27, wherein the vehicle running data includes at least one of an absolute value of a product of a vehicle speed and a lateral acceleration of the vehicle, an absolute value of a yaw rate of the vehicle, an absolute value of the lateral acceleration of the vehicle, an absolute value of a steering angle, an average vehicle speed, and an absolute value of a longitudinal acceleration speed.

29. The method for estimating a turning characteristic of a vehicle according to claim 28, wherein the vehicle running data is the absolute value of the product of the vehicle speed and the lateral acceleration of the vehicle, the absolute value of the yaw rate of the vehicle, the absolute value of the lateral acceleration of the vehicle, the absolute value of the steering angle, the average vehicle speed, and the absolute value of the longitudinal acceleration speed.

30. The method for estimating a turning characteristic of a vehicle according to claim 18, further comprising the steps of:
   determining a reliability of the estimated turning characteristic of the vehicle; and
   making it more difficult to make a determination that a vehicle behavior has deteriorated when the reliability of the turning characteristic of the vehicle is low, compared to when that reliability is high.

31. The method for estimating a turning characteristic of a vehicle according to claim 30, wherein the value corresponding to the standard turning state is a standard yaw rate of the vehicle, and the value corresponding to the actual turning state is an actual yaw rate of the vehicle.

32. The method for estimating a turning characteristic of a vehicle according to claim 31, further comprising the step of:
   determining the vehicle behavior based on the size of a difference between standard yaw rate of the vehicle and the actual yaw rate of the vehicle.

33. The method for estimating a turning characteristic of a vehicle according to claim 32, further comprising the steps of:
   determining the vehicle behavior by determining whether the size of the difference between the standard yaw rate of the vehicle and the actual yaw rate of the vehicle is greater than a reference value; and making it more difficult to make the determination that the vehicle behavior has deteriorated by making that reference value larger when the reliability of the turning characteristic of the vehicle is low, compared to when that reliability is high.

34. The method for estimating a turning characteristic of a vehicle according to claim 31, wherein the turning characteristic of the vehicle is a value related to a stability factor and a time constant of a steering response, and further comprising the step of:

determining a reliability of the stability factor based on a change in the stability factor that is estimated every time the vehicle turns.

* * * * *